United States Patent
Wright et al.

(10) Patent No.: US 8,403,612 B2
(45) Date of Patent: Mar. 26, 2013

(54) FASTENER ASSEMBLY

(75) Inventors: Sean Anthony Wright, Livonia, MI (US); William Brian Deming, Fenton, MI (US); Steven Edward Owen, Amherstburg (CA); Jamaine Channte Arrington, Ann Arbor, MI (US); Vasudeva Sankarshana Murthy, Ann Arbor, MI (US)

(73) Assignees: Toyota Motor Engineering & Manufacturing North America, Inc., Erlanger, KY (US); Quality Safety Systems, Tecumseh (CA)

( * ) Notice: Subject to any disclaimer, the term of this patent is extended or adjusted under 35 U.S.C. 154(b) by 517 days.

(21) Appl. No.: 12/511,544

(22) Filed: Jul. 29, 2009

(65) Prior Publication Data

US 2011/0027040 A1 Feb. 3, 2011

(51) Int. Cl.
*F16B 33/00* (2006.01)

(52) U.S. Cl. ............... 411/367; 411/371.2; 411/353; 411/519; 411/540

(58) Field of Classification Search ............ 411/337, 411/338, 346, 350, 353, 367, 371.2, 372, 411/372.6, 508, 517, 519, 520, 539, 540, 411/549, 553, 555, 913; 24/297, 458; 16/2
See application file for complete search history.

(56) References Cited

U.S. PATENT DOCUMENTS

| | | | | | |
|---|---|---|---|---|---|
| 2,354,748 | A | * | 8/1944 | Franklin | 439/550 |
| 3,032,807 | A | * | 5/1962 | Lanius, Jr. | 16/97 |
| 3,243,206 | A | * | 3/1966 | Samer | 285/154.1 |
| 4,394,050 | A | | 7/1983 | Spooner | |
| 4,952,107 | A | * | 8/1990 | Dupree | 411/103 |
| 5,020,951 | A | * | 6/1991 | Smith | 411/107 |
| 5,429,467 | A | * | 7/1995 | Gugle et al. | 411/182 |
| 5,468,046 | A | | 11/1995 | Weber et al. | |
| 5,511,919 | A | * | 4/1996 | Scalise | 411/555 |
| 5,603,527 | A | | 2/1997 | Bee | |
| 5,795,122 | A | * | 8/1998 | Bowers | 411/551 |
| 6,059,502 | A | * | 5/2000 | Konig et al. | 411/182 |
| 6,309,024 | B1 | | 10/2001 | Busch | |
| 6,664,470 | B2 | * | 12/2003 | Nagamoto | 174/652 |
| 6,712,571 | B2 | * | 3/2004 | Krohlow et al. | 411/45 |
| 7,001,128 | B2 | * | 2/2006 | Kuntze | 411/508 |
| 7,080,856 | B2 | * | 7/2006 | Desmarais et al. | 280/808 |
| 7,367,590 | B2 | | 5/2008 | Koning et al. | |
| 2002/0145422 | A1 | * | 10/2002 | Chamings et al. | 324/207.26 |
| 2007/0001444 | A1 | * | 1/2007 | Smith et al. | 280/808 |
| 2007/0114777 | A1 | * | 5/2007 | Gray | 280/808 |

* cited by examiner

*Primary Examiner* — Roberta Delisle
(74) *Attorney, Agent, or Firm* — Gifford, Krass, Sprinkle, Anderson & Citkowski, P.C.

(57) ABSTRACT

A fastener assembly for attaching a fastener to an opening of a sheet material is disclosed. The sheet material is typically located adjacent to a base structure and the fastener assembly affords radial movement of the fastener relative to the opening of the sheet material. The radial movement allows the fastener to be aligned with a desired location on the base structure, e.g. a threaded aperture—after being attached to the sheet material. In this manner, the fastener assembly provides for the placement of the fastener in difficult to reach and/or see locations until it can be attached to the base structure.

8 Claims, 4 Drawing Sheets

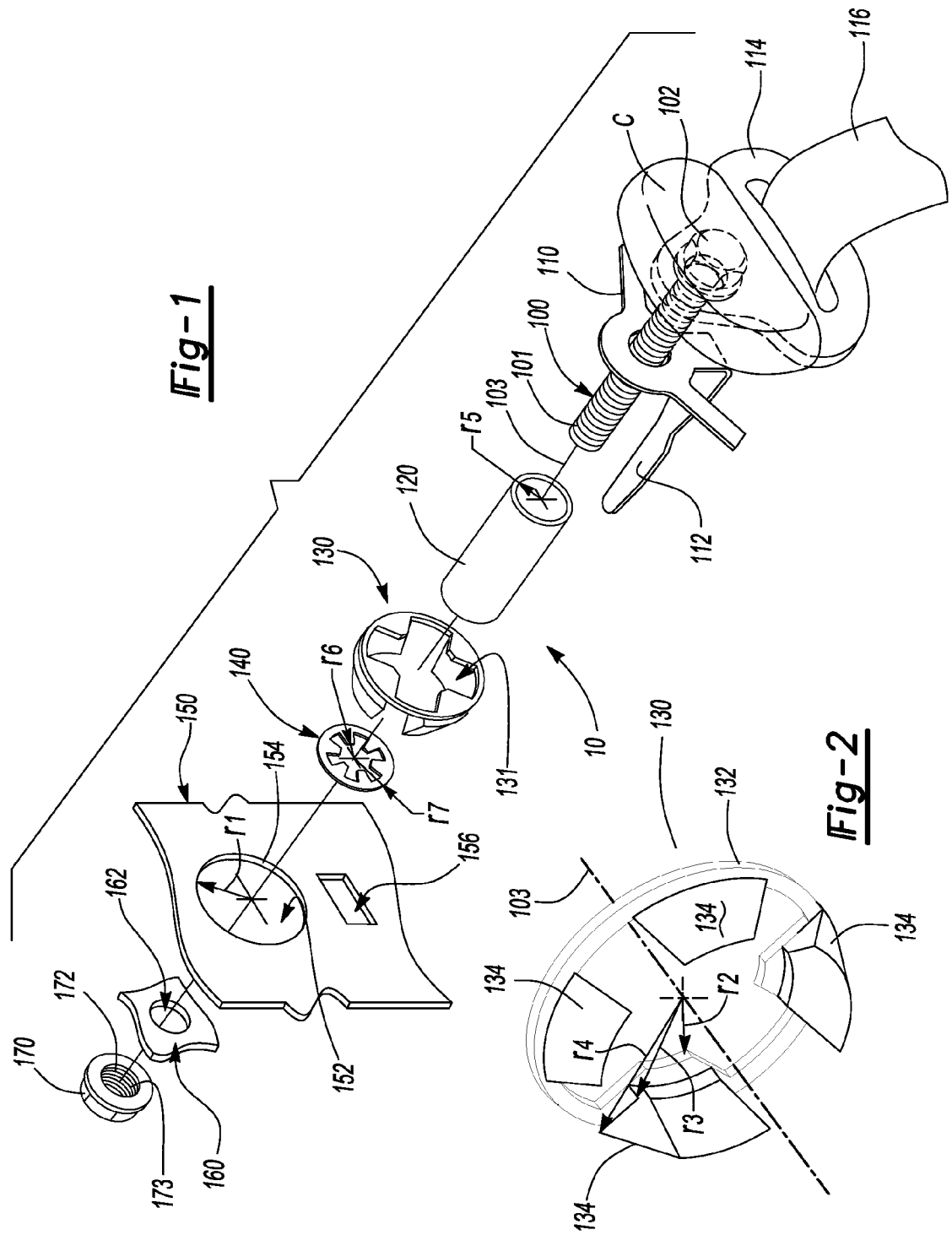

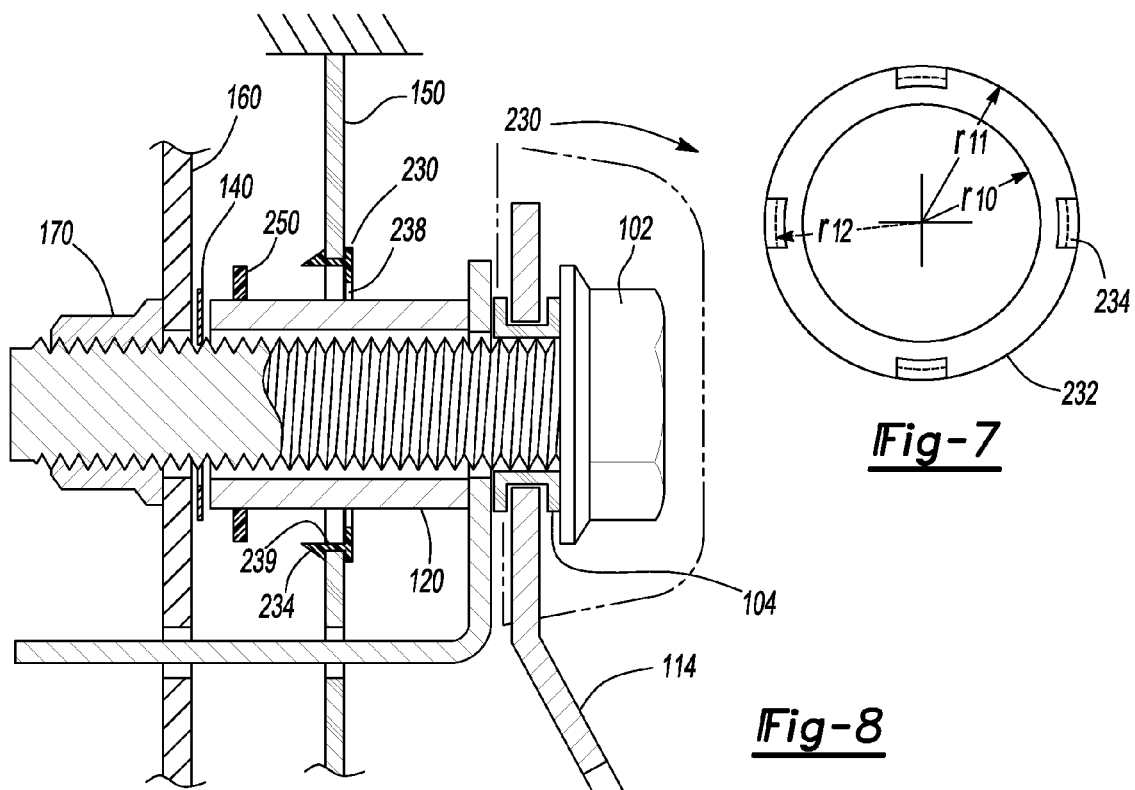
*Fig-7*
*Fig-8*
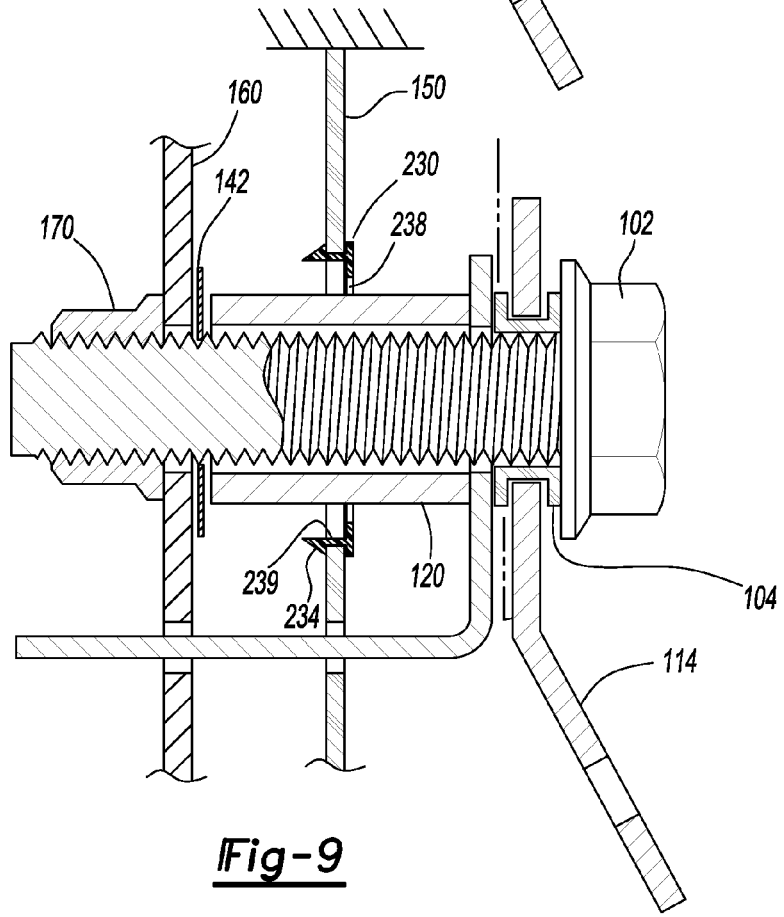
*Fig-9*

FASTENER ASSEMBLY

FIELD OF THE INVENTION

The present invention relates to a fastener assembly for attaching a fastener to an opening of a sheet material, and in particular, a fastener assembly for attaching a fastener to an opening of a sheet material and providing the fastener with radial movement relative to the opening.

BACKGROUND OF THE INVENTION

The use of fasteners to attach a component to a base structure either on or within a machine is known. For example, a combination lap-shoulder seatbelt assembly including a shoulder belt webbing for extending across the torso of an occupant and a lap belt webbing for extending generally horizontally across the lap of the occupant is known to be attached to a body portion of a motor vehicle using one or more fasteners. In some instances, the lap-shoulder seat belt assembly includes a generally triangular-shaped bracket, often referred to as a D-ring, and the D-ring is pivotally mounted to the motor vehicle body using a threaded fastener such as a bolt.

Typically, attachment of the D-ring to the base structure or body of the motor vehicle occurs during assembly line manufacturing thereof. In such instances, the time and ease of convenience for attaching the D-ring to the body can be critical. For example, the process or functions that are required to hold the D-ring and the threaded fastener in a desired location until the fastener can be threaded into a threaded aperture can cause excess time and/or inconvenience for an assembly line worker. In addition, if the D-ring is to be attached at a location where the assembly line worker cannot actually see the threaded fastener and/or threaded aperture, aligning the fastener with the aperture can require additional time and/or inconvenience for the individual.

Heretofore fastener assemblies for attaching a component to a base structure have generally required that an assembly line worker be able to see the threaded aperture so that the threaded fastener can be aligned before attaching the component to the base structure. In the alternative, workers have had to hold and "feel" where the threaded fastener is in relation to the threaded aperture with one hand, and then place a wrench or screwdriver on the threaded fastener with the other hand, before the fastener can be threaded into the aperture. Such fastener assemblies have caused excess time and inconvenience for assembly line workers. Therefore, an improved fastener assembly for attaching a component to a base structure would be desirable.

SUMMARY OF THE INVENTION

A fastener assembly for attaching a fastener to an opening of a sheet material is disclosed. The fastener assembly provides radial movement of the fastener relative to the opening of the sheet material, the radial movement allowing alignment of the fastener with a base structure aperture that is adjacent to the sheet material. The fastener assembly can include an elongated threaded fastener that has a head and a longitudinal axis. In addition, the assembly can include a clip with an aperture, at least one catch tab and a radial space portion. The threaded fastener extends longitudinally through the aperture of the clip, and in some instances, a lock washer can also be included and attached to the threaded fastener at a location spaced apart from the head thereof with the clip located between the lock washer and the head. In some instances, the lock washer is a tooth lock washer.

The at least one catch tab is dimensioned to attach the clip to the opening of the sheet material and the radial space portion is dimensioned such that the clip and/or threaded fastener can move radially a predetermined amount relative to the opening. In addition, the clip can have a ring portion with the aperture extending through, and the at least one catch tab extending from, the ring portion. The ring portion can have an inner dimension that is less than an outer dimension of the threaded fastener head such that the clip cannot slide over the head. In addition, the ring portion can have an inner dimension that is less than an outer dimension of the lock washer such that the clip cannot slide over the lock washer either. In this manner, the clip is attached to the threaded fastener, and vice-versa.

The catch tab can have a radial catch surface that is spaced apart from the ring portion and the radial space portion can be located and/or defined between the radial catch surface and the ring portion. In addition, the at least one catch tab can extend in a generally normal direction from the ring portion.

The at least one catch tab can also have a living hinge between the radial catch surface and the ring portion, the living hinge being operable to allow the radial catch surface to be displaced from a 'catch position' in order to pass through the opening of the sheet material. After the radial catch surface has passed through the opening, the living hinge affords for the catch surface to return to the catch position and engage the back side of the opening. In this manner, the sheet material can be located or bounded between the radial catch surface and the ring portion of the clip, thereby attaching the clip to the sheet material. The radial space portion can be a radial groove with a depth that affords for the clip to move relative to the opening and/or vice versa. A D-ring for a seatbelt strap can be included and attached to the threaded fastener, the fastener assembly operable to attach the D-ring to a pillar of a motor vehicle.

A process for attaching a component to a base structure is also disclosed, the process including providing the base structure with a threaded aperture and a sheet material or panel located adjacent to the base structure. The panel can have an opening and a perimeter bounding the opening. Also provided is the fastener assembly described above, the fastener assembly having the clip with at least one catch tab that is dimensioned to attach to the panel. A component to be attached to the base structure is included, the component being attached to the threaded fastener between the head thereof and the clip.

The clip with the threaded fastener attached thereto can be placed at least partially through the opening of the sheet material such that the catch tab engages the perimeter bounding the opening, the clip and the threaded fastener thus being attached to the panel. The clip has the radial space portion that can afford radial movement of the threaded fastener relative to the opening. As such, the threaded fastener can be aligned with the threaded aperture of the base structure, the radial movement provided by the clip affording for the alignment. Finally, the threaded fastener can be rotated relative to the threaded aperture such that the threaded fastener is screwed therein and the component is attached to the base structure.

BRIEF DESCRIPTION OF THE DRAWINGS

FIG. 1 is an exploded perspective view of an embodiment of the present invention;

FIG. 2 is a perspective view of a clip shown in FIG. 1;

FIG. 7 is an end view of the clip shown in FIG. 6;

FIG. 8 is a side cross-sectional view of the embodiment shown in FIG. 6 with a D-clip attached to a base structure; and FIG. 9 is a side cross-sectional view of a different embodiment of the present invention.

DETAILED DESCRIPTION OF THE INVENTION

Figure 3:
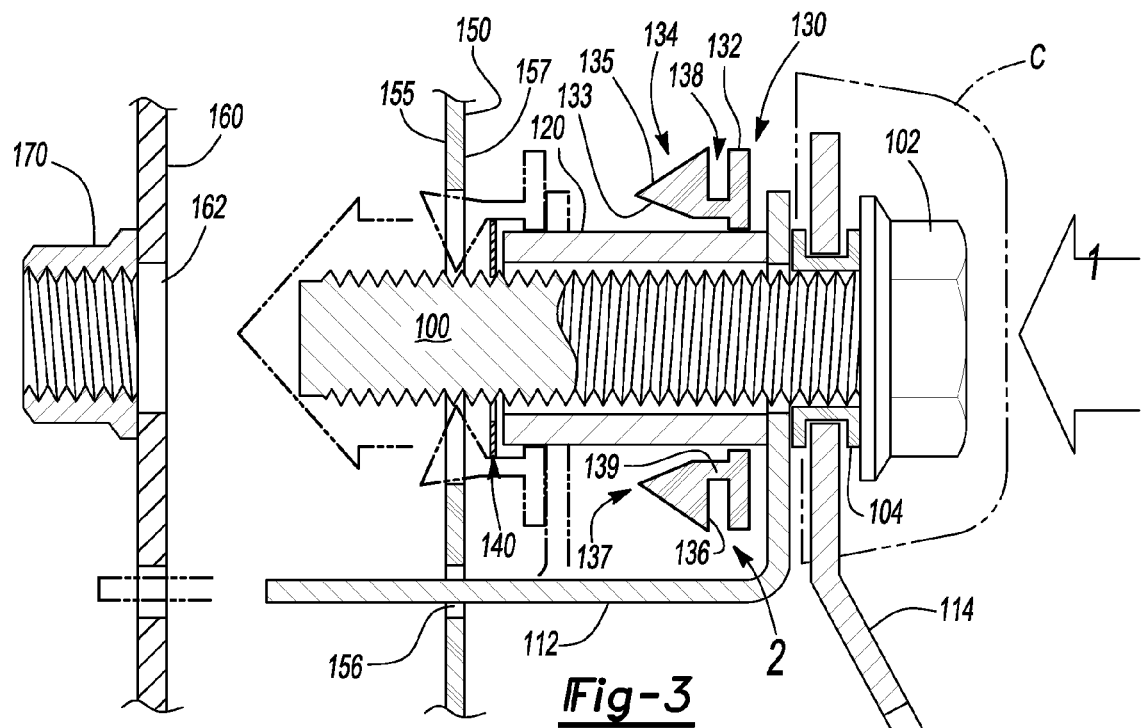
FIG. 3 is a side cross-sectional view of the embodiment shown in FIG. 1 illustrating a clip being attached to a sheet material or panel.

The present invention discloses a fastener assembly for attaching a fastener and a component to an opening of a sheet material. As such, the present invention has utility as an assembly for attaching a component to a sheet material, panel and the like.

The fastener assembly can include an elongated threaded fastener, a clip and a lock washer. The elongated threaded fastener can have a head and a longitudinal axis and may be in the form of a bolt, a shoulder bolt, a screw, a lag bolt and the like. The clip can have an aperture, at least one catch tab and a radial space portion. The threaded fastener extends longitudinally through the aperture and the lock washer is attached to the threaded fastener and spaced apart from the head. As such, the clip can be located between the lock washer and the head of the threaded fastener.

In some instances, the clip has a ring portion and the aperture extends through, and the at least one catch tab extends from, the ring portion. The ring portion can have an inner dimension that is less than an outer dimension of the head of the threaded fastener. For example, the ring portion can have an inner diameter that is less than an outer diameter of the head. In this manner, the clip cannot slide over the head. In addition, the lock washer can have an outer dimension that is greater than the inner dimension of the ring portion such that the clip cannot slide over the lock washer. As such, the clip which has the threaded fastener extending therethrough is attached to the fastener, and vice versa.

The radial space portion allows for the clip, and thus the threaded fastener attached thereto, to move with respect to an opening of a sheet material when the clip is attached to the the sheet material. The catch tab can have a radial catch surface that is spaced apart from the ring portion and the radial space portion can be located and/or defined between the radial catch surface and the ring portion. For example, the radial space portion can be a radial groove that has a predetermined depth with an inner dimension that is less than an inner dimension of the opening of the sheet material. In addition, the radial catch surface can have an outer dimension that is greater than the inner dimension of the opening of the sheet material. As such, the radial catch surface can engage a back side of the opening and a perimeter of the opening can be located at least partially within the radial groove.

With excess space between the perimeter of the opening and the inner dimension of the radial groove, movement of the clip is afforded once the perimeter of the opening is located within the radial groove. Stated differently, the radial groove can have an inner diameter that is less than an inner diameter of the opening and an outer diameter that is greater than the inner diameter of the opening. In this manner, the sheet material can be located and/or trapped within the radial groove and yet the clip can move radially relative to the opening.

A living hinge can be located between the radial catch surface and the ring portion such that at least part of the catch tab and/or radial catch surface can be displaced from a catch position in order to pass through the opening. After the radial catch surface has passed through the opening, the living hinge affords for the catch surface to return to the catch position and engage the back side of the sheet material bounding the opening. In this manner, the sheet material can be located and/or trapped within the radial groove between the radial catch surface and the ring portion of the clip.

In some instances, the threaded aperture can be a bolt, the sheet material can be a garnish, and the component can be a D-ring attached to the bolt between the head of the bolt and the clip. The garnish can have an opening, such as an aperture, and the garnish can be adjacent to a pillar on the interior of a motor vehicle. As such, the threaded fastener with the D-ring and the clip can be attached to the garnish—before the fastener is screwed into a threaded aperture that is part of and/or is attached to the pillar.

As stated above, the clip affords for the bolt to move in a radial direction with respect to the garnish and thus affords for the bolt to be aligned to the threaded aperture while it attached to the garnish before being threaded into the aperture. In this manner, a D-ring for a seat belt assembly can be attached within a motor vehicle. In particular, the D-ring can be attached at a difficult-to-see and/or difficult-to-reach location within a motor vehicle. Such a location can be a "blind location" where for the purposes of the present invention, the term "blind location" is defined as a location where the assembly line worker does not have complete visual sight of the threaded fastener and/or the threaded aperture. As such, the assembly line worker can grasp the fastener assembly, attach it to the garnish opening, and take a wrench or other similar tool and align the threaded fastener to the threaded aperture and screw the fastener therein.

A process for attaching a component to a base structure using the fastener assembly is also disclosed. The process includes providing a base structure having a threaded aperture, for example a B-pillar, C-pillar, D-pillar and the like of a motor vehicle. The threaded aperture can be a nut that is attached to a front side and/or a back side of the base structure as is known to one skilled in the art. A panel or sheet material is provided and located adjacent to the base structure. The panel has an opening and a perimeter that bounds the opening. In some instances, the opening is an aperture which may or may not be in the form of a circle and the perimeter has an inner dimension.

The process further includes providing the fastener assembly as described above and a component to be attached to the base structure. The component can be attached to the threaded fastener and located between the head of the fastener and the clip. Thereafter, the clip is placed at least partially through the opening of the panel such that the catch tab engages the perimeter bounding the opening and the clip and the threaded fastener are attached to the panel. The radial movement provided by the clip can afford a freedom of radial movement to the threaded fastener such that it can be, and is, aligned with the threaded aperture of the base structure. Finally, the threaded fastener can be rotated relative to the threaded aperture such that it is screwed therein and the component is attached to the base structure.

As noted above, the threaded aperture can be a bolt and the component can be a D-ring. In addition, alignment of the threaded fastener with the threaded aperture and the rotation of the threaded fastener can be a "blind operation", where for the purposes of the present invention the term blind operation is defined as an operation where an individual can not fully or clearly see the threaded fastener and/or threaded aperture and thus aligns and/or threads the fastener relative to the aperture other by "feel".

Turning now to FIG. 1, an embodiment of the fastener assembly is shown generally at reference numeral 10. The fastener assembly 10 can include a threaded fastener 100 which has a head 102. An alignment fixture 110 can be included which has a leg 112, the alignment fixture 110 affording for the alignment of a cover C. The threaded fastener 100 has a longitudinal axis 103 as shown in the figure. For the purposes of illustration, the axis 103 is assumed to be centrally located through the threaded fastener 100 and through an optional spacer 120, a clip 130, a lock washer 140, an opening 152 within a sheet material 150, an aperture 162 within a base structure 160, and a threaded aperture 172 of a nut 170. As shown in the figure, the optional spacer 120 can have an inner dimension r5 that is greater than an outer dimension of the threaded fastener 100 such that the spacer 120 can fit or slide onto the threaded fastener 100.

Looking now at FIG. 2, a perspective view of the clip 130 shown in FIG. 1 is provided. The clip 130 has at least one catch tab 134 and an aperture 131. In some instances, the clip 130 can have a ring portion 132 in which the aperture 131 extends therethrough and the at least one catch tab 134 extends therefrom. The aperture 131 can have an inner dimension r2 that is greater than an outer diameter of the threaded fastener 100 and less than an outer dimension of the head 102. In this manner, the clip 130 can fit or slide onto the threaded fastener 100 and yet not slide over or past the head 102. In the alternative, the inner dimension r2 is greater than the outer dimension of the head 102 and the alignment fixture 110, or some other component, can prevent the clip 130 from sliding over the head 102.

The opening 152 has an inner dimension r1 and a bounding perimeter 154. In some instances, the opening 152 can be in the form of an aperture and have a diameter that is equal to twice the radius thereof. For example, the opening 152 can have a radius equal to the inner dimension r1 and the diameter would be equal to 2×r1. As such, it is appreciated that the terms inner dimension, outer dimension, etc. are illustrated in the figures as inner radius, outer radius, etc., however the terms can include inner diameter, outer diameter and the like, and are used to describe whether or not one part of the assembly 10 can fit over or slide past a different part of the assembly.

The lock washer 140 can be included and have an outer dimension r7 that is greater than the inner dimension r2 of the clip 130 such that the clip 130 can not slide past or fit over the lock washer 140. In addition, the lock washer 140 has an inner dimension r6 that affords for the washer to slide onto the threaded fastener 100. In some instances, the lock washer 140 is a tooth lock washer that can be rotated or threaded onto the threaded fastener 100.

Figure 4:
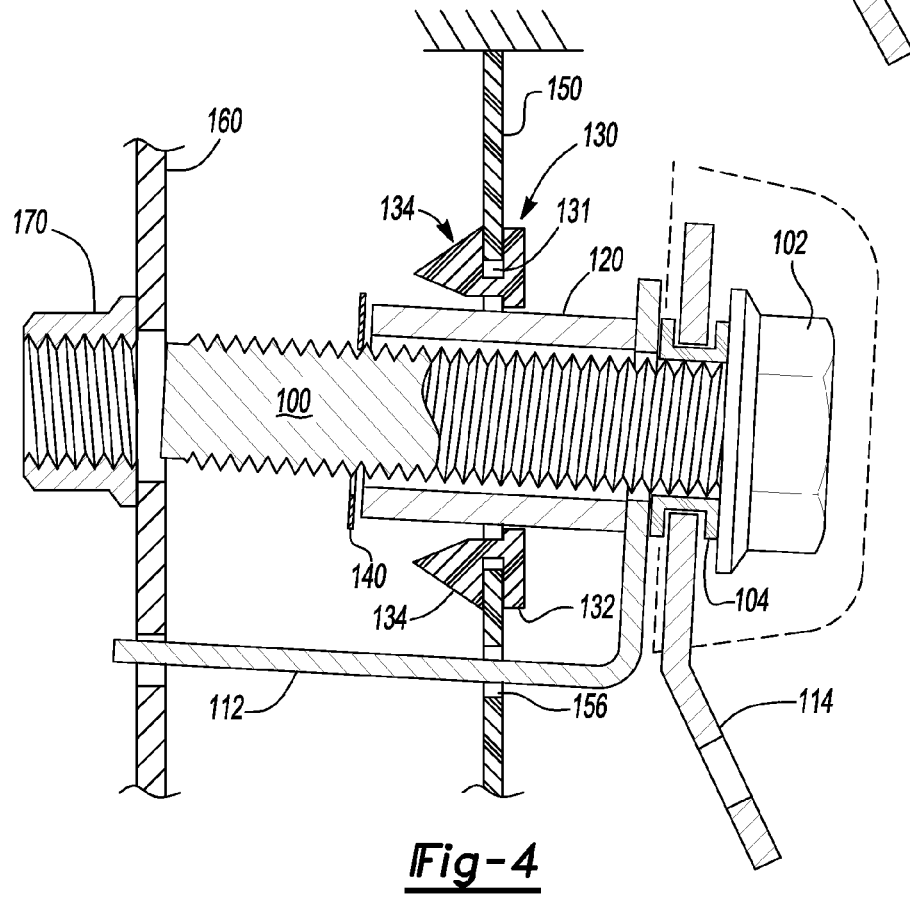
FIG. 4 is a side cross-sectional view of the embodiment shown in FIG. 3 after the clip has been attached to the sheet material.

Referring now to FIG. 3, the clip 130 with the at least one catch tab 134 can have a radial space portion 138 located between the ring portion 132 and a radial catch surface 136. The radial space portion 138 can have an inner dimension r3 (FIG. 2) and the catch surface 136 can have an outer dimension r4 (FIG. 2). The inner dimension r3 of the radial space portion 138 can be less than the inner dimension r1 of the opening 152. In contrast, the outer dimension r4 of the radial catch surface 136 can be greater than the inner dimension r1 of the opening 152. In this manner, the perimeter 154 of the opening 152 can be located within the radial space portion 138 as shown in FIG. 4. In addition, the radial catch surface 136 can engage a back side 155 of the opening 152 and/or perimeter 154 while the ring portion 132 can engage a front side 157 of the opening 152 and/or ring portion 154, thereby affording the clip 130 to be attached to the sheet material 150.

The inner dimension r3 of the radial space portion 138 can also be less than the inner dimension r1 of the opening 152 by a predetermined amount such that a desired tolerance or freedom of radial movement between the clip 130 and the sheet material 150 is afforded. More particularly, with the clip attached to the threaded fastener 100, the threaded fastener 100 can have a freedom of radial movement relative to the sheet material 150 once the clip 130 and the attached threaded fastener 100 are attached to the opening 152. For the purposes of the present invention, the term radial movement is defined as movement that is generally parallel to radial direction of the opening 152.

As illustrated in FIG. 3, the at least one catch tab 134 can have a first surface 133 and a second surface 135 that provide a V-shape 137. Movement of the fastener assembly 10 in a first direction 1 results in the V-shape 137 of the catch tab 134 and the living hinge 139 affording for the catch tab 134 to pass through the opening 152 of the sheet material 150. However, after at least part of the catch tab 134 passes through the opening 152, the living hinge 139 affords for the radial catch surface 136 engaging a back side of the opening 152 and thus attaching the clip 130 to the sheet material 150. Stated differently, the radial catch surface 136 is displaced from a catch position 2 such that it can pass through the opening 152. After passing through the opening 152, the radial catch surface 136 returns to the catch position 2 where it can engage the back side 155 of the sheet material 150 as shown in FIG. 4.

Figure 5:
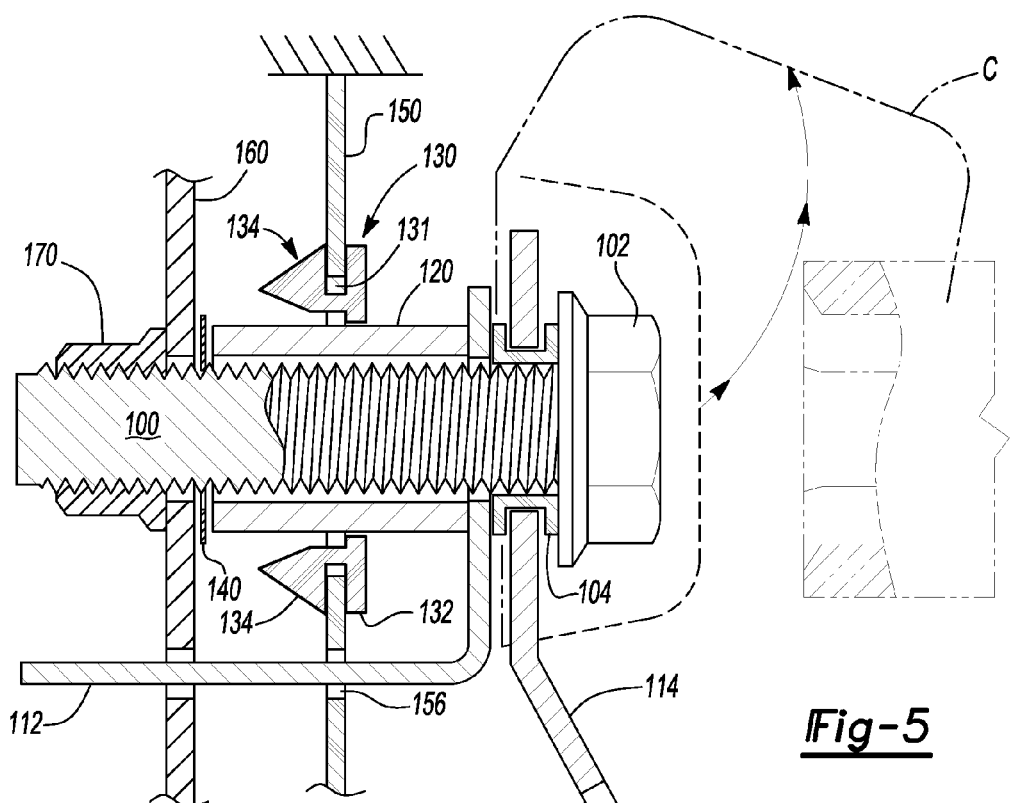
FIG. 5 is a side cross-sectional view of the embodiment shown in FIG. 4 after a D-clip has been attached to the base structure.

Once the clip 130 is attached to the sheet material 150, the difference between the inner dimension r1 of the opening 152 and the inner dimension r3 of the radial space portion 138 provides a clearance 131 therebetween which affords for the clip 130, and thus the threaded fastener 100, to have a freedom of radial movement relative to the sheet material 150. As shown in FIG. 4, the threaded fastener 100, with or without the component 114 thereon, can hang from the sheet material 150. In addition, the freedom of radial movement affords for the fastener 100 to be aligned with an aperture 162 of the base structure 160 and/or a threaded aperture 172. Thereafter, the threaded fastener 100 can be rotated such that the threads 101 engage the threads 173 of the threaded aperture 172 and afford for attachment of the threaded fastener 100 and a component 114 to the base structure 160 as shown in FIG. 5. It is appreciated that a wrench, e.g. a torque wrench as illustrated in phantom in the figure, can be used to align the threaded fastener 100 and thus the fastener assembly without the use of another hand.

In some instances, the component 114 can be a D-ring that affords for a seatbelt strap 116 to pass therethrough and provide at least part of a seatbelt assembly for an occupant in a motor vehicle. In addition, the cover C can be provided that will cover the head 102 of the threaded fastener 100. Also, the leg 112 of the alignment fixture 110 as shown in FIGS. 1, 3 and 4 can extend through an aperture 156 of the sheet material 150. The alignment fixture 110 can then ensure that the cover C remains in a desirable position.

In use, the threaded fastener 100 with the component 114, clip 130 and lock washer 140 can be provided, assembled and attached to the sheet material 150 using the clip 130. Thereafter, the threaded fastener 100 is aligned with the aperture 162 and/or threaded aperture 172 and a wrench can be placed on the head 102 before or after alignment. Finally, the threaded fastener 100 is rotated or screwed into the threaded aperture 172, thereby attaching the component to the base structure 170. It is appreciated that the attachment of the threaded aperture 100 to the sheet material 150 using the clip 130 affords for the alignment and rotation of the threaded fastener 100 to be performed as a blind operation. In this manner, the component 114, for example a D-ring for a seatbelt assembly, can be attached to the interior of a motor vehicle with minimum inconvenience even though an assembly line worker cannot fully see to align the threaded fastener 100 with the opening 152, opening 162 and/or threaded aperture 172.

Figure 6:
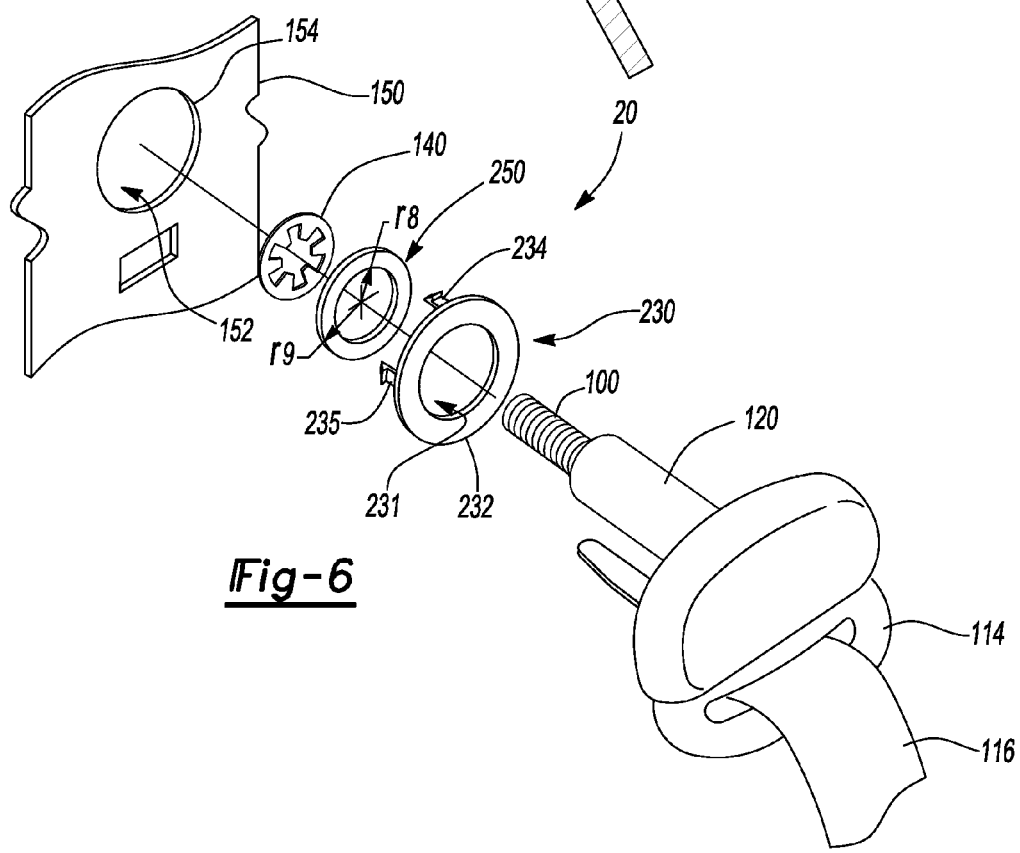
FIG. 6 is an exploded perspective view of a different embodiment of the present invention.

Turning now to FIGS. 6-8, a separate embodiment of a fastener assembly is shown generally at reference numeral 20. The fastener assembly 20 includes the same threaded fastener 100, alignment fixture 110, component 114, optional spacer 120, lock washer 140, cover C and the like. However, a clip 230 is included, the clip 230 having an aperture 231 and at least one catch tab 234. A radial space portion 238 is provided between an inner dimension r10 of the clip 230 and an outer dimension of the threaded fastener 100 or outer dimension of the spacer 120. Stated differently, the aperture 231 of the clip 230 is relatively large with respect to the size of the threaded fastener 100 or spacer 120, thereby affording the threaded fastener 100 movement in a radial direction relative to the clip 230 and the sheet material 150 once the clip 230 is attached thereto.

With the aperture 231 being relatively large, an optional washer 250 can be included with an inner dimension r8 being less than the outer dimension r7 of the lock washer 140 and an outer dimension r9 being greater than the inner dimension r10 of the aperture 231. It is appreciated that the washer 250 can prevent the clip 230 from sliding over the lock washer 140 and thus attaches the clip to the threaded fastener 100, and vice-versa.

The clip 230 with the at least one catch tab 234 also has a living hinge 239 and a radial groove 235 that affords for the perimeter 154 of the opening 152 to fit therewithin and thus attach the clip 230 to the sheet material 150. However, in the embodiment 20, the radial space portion 238 is provided between the inner dimension r10 of the clip 230 and the outer dimension of the threaded fastener 100 or the outer dimension of the optional spacer 120.

It is appreciated that the radial space portion can include two separate radial space portions. For example, one of the radial space portions can be a space between the perimeter 154 of the opening 152 and an inner dimension of a clip radial groove, and the other radial space portion can be a space between an inner dimension r10 of the ring portion 232 and the outer dimension of the threaded fastener 100 or the optional spacer 120.

Referring now to FIG. 9, another embodiment of a fastener assembly is shown where the lock washer 140 and washer 250 are replaced with a lock washer 142. The lock washer 142 has a outer diameter that is generally equivalent to the outer diameter of the washer 250 and thus affords for the clip 230 to not slide off of the spacer 120. In this manner, a reduction of parts for a fastener assembly as taught above is provided.

The threaded fastener can be made from any material known to those skilled in the art, illustratively including metals, alloys, plastics, ceramics and the like. In addition, the clip can be made from a polymer, a metal, alloys, etc. The other components described herein can be made from typical materials used to make components, fixtures, garnishes, bolts, base structures, etc., such as metals, alloys, plastics, ceramics, wood and the like.

In view of the teaching presented herein, it is to be understood that numerous modifications and variations of the present invention will be readily apparent to those of skill in the art. Likewise, the foregoing is illustrative of specific embodiments of the invention, but is not meant to be a limitation upon the practice thereof. It is the following claims, including all equivalents, which define the scope of the invention.

We claim:

1. A seatbelt assembly for an occupant in a motor vehicle, said seatbelt assembly comprising:
   a base structure having a fastener aperture;
   a sheet material adjacent one side of said base structure and a threaded aperture adjacent an opposite side of said base structure, said sheet material having an opening and an alignment aperture;
   a D-ring with a seatbelt strap passing therethrough, said D-ring attached to said base structure via a fastener assembly, said fastener assembly having:
      an elongated threaded fastener having a head and a longitudinal axis extending through said sheet material opening, through said fastener aperture of said base structure and into said threaded aperture;
      a clip having a ring portion, an aperture, at least one catch tab with a radial catch surface and a radial space portion, said threaded fastener extending longitudinally through said aperture, said at least one catch tab extending in a generally normal direction from said ring portion and said radial catch surface spaced apart from said ring portion;
      said radial space portion located between said radial catch surface and said ring portion with said radial catch surface having an outer dimension that is greater than an inner dimension of the opening of the sheet material;
      a living hinge between said radial catch surface and said ring portion, said living hinge operable to allow said radial catch surface to pass through the opening of the sheet material and engage the back side of the sheet material, whereby the clip is attached to the sheet material; and
      a lock washer attached to said threaded fastener and spaced apart from said head, said clip located between said lock washer and said head;
   a cover for covering said head of said elongated threaded fastener;
   an alignment fixture with a leg, said alignment fixture located between said D-ring and said sheet material with said leg extending through said alignment aperture of said sheet material and operable to align said cover over said head of said elongated threaded fastener;
   wherein said at least catch tab is dimensioned to attach said clip to the opening of the sheet material and said radial space portion, dimensioned for said threaded fastener to move radially a predetermined amount relative to the opening of the sheet material.

2. The fastener assembly of claim 1, wherein said ring portion of said clip has an inner dimension and said head of said threaded fastener has an outer dimension, said inner dimension of said ring portion being less than said outer dimension of said head, whereby said clip cannot slide over said head.

3. The fastener assembly of claim 2, wherein said lock washer has an outer dimension greater than said inner dimension of said ring portion, whereby said clip cannot slide over said lock washer.

4. The fastener assembly of claim 3, wherein said lock washer is a tooth lock washer.

5. The fastener assembly of claim 1, wherein said radial space portion is a radial groove, said radial groove having a width greater than a thickness of the sheet material and a depth with an inner dimension that is less than an inner dimension of the opening of the sheet material, whereby at least part of the sheet material bounding the opening can be located within the radial groove when the clip is attached to the sheet material.

6. The fastener assembly of claim 5, wherein said radial groove has an inner diameter that is less than an inner diameter of the opening of the sheet material, whereby the inner diameter of the opening is located within the radial groove and the clip can move in a radial direction.

7. The fastener assembly of claim 1, wherein said radial space portion is located between an inner dimension of said aperture and an outer dimension of said threaded fastener.

8. The fastener assembly of claim 1, further comprising a D-ring for a seatbelt strap, said D-ring attached to said threaded fastener.

* * * * *